US007654001B2

(12) United States Patent
Martin et al.

(10) Patent No.: US 7,654,001 B2
(45) **Date of Patent: *Feb. 2, 2010**

(54) METHOD OF MANUFACTURING A PAINT ROLLER SUPPORT

(75) Inventors: Berj A. Martin, Boring, OR (US); Gregg R. Sorenson, West Allis, WI (US)

(73) Assignee: The Sherwin-Williams Company, Cleveland, OH (US)

( * ) Notice: Subject to any disclaimer, the term of this patent is extended or adjusted under 35 U.S.C. 154(b) by 148 days.

This patent is subject to a terminal disclaimer.

(21) Appl. No.: 11/369,442

(22) Filed: Mar. 6, 2006

(65) Prior Publication Data

US 2006/0143918 A1 Jul. 6, 2006

Related U.S. Application Data

(63) Continuation of application No. 10/391,496, filed on Mar. 17, 2003, now Pat. No. 7,028,365.

(51) Int. Cl.
*B23P 17/00* (2006.01)
*B05C 17/02* (2006.01)

(52) U.S. Cl. .............. 29/895.2; 29/895.213; 29/895.22; 29/895.23; 492/13; 492/17; 492/19; 492/45; 492/47; 15/230.11

(58) Field of Classification Search .................. 29/895, 29/895.1, 895.2, 895.211, 598.212, 895.213, 29/895.22, 895.23; 492/13, 17, 19, 45, 47
See application file for complete search history.

(56) References Cited

U.S. PATENT DOCUMENTS

| | | | |
|---|---|---|---|
| 2,197,883 | A | 4/1940 | Sinclair |
| 2,520,863 | A | 8/1950 | Thomas et al. |
| 2,647,276 | A | 8/1953 | Thomas et al. |
| 2,669,743 | A | 2/1954 | Coughlan |
| 2,675,605 | A | 4/1954 | Thomas |
| 2,678,473 | A | 5/1954 | Butler |
| 2,684,497 | A | 7/1954 | Graham |
| 2,751,618 | A | 6/1956 | Pruitt |
| 2,935,757 | A | 5/1960 | Phillips |
| 2,970,366 | A | 2/1961 | Gill |
| 2,977,671 | A | 4/1961 | Wiegand |
| 2,982,010 | A | 5/1961 | Johns |

(Continued)

FOREIGN PATENT DOCUMENTS

| | | |
|---|---|---|
| CA | 2075575 | 5/1993 |

(Continued)

*Primary Examiner*—David P Bryant
*Assistant Examiner*—Sarang Afzali
(74) *Attorney, Agent, or Firm*—Klarquist Sparkman, LLP

(57) ABSTRACT

Embodiments of a method for manufacturing a paint roller support are disclosed. According to one embodiment, a method of manufacturing a paint roller support comprises placing first and second bearings on an elongated shaft at spaced apart locations such that the bearings are retained against rotational and axial movement relative to the shaft, and placing first and second rotatable hubs on the first and second bearings, respectively, the hubs being configured to rotate relative to the bearings and to each other and having outer surfaces on which a roller cover is placed during use, wherein the first and second hubs are retained on the shaft by the first and second bearings, respectively.

19 Claims, 4 Drawing Sheets

U.S. PATENT DOCUMENTS

| | | | | |
|---|---|---|---|---|
| 2,987,746 | A | | 6/1961 | Davis et al. |
| 3,060,555 | A | | 10/1962 | Kirshenbaum et al. |
| 3,335,446 | A | | 8/1967 | McGinley |
| 3,447,184 | A | | 6/1969 | McGinley |
| 3,711,887 | A | * | 1/1973 | Chapman ................ 15/230.11 |
| 3,745,624 | A | | 7/1973 | Newman |
| 3,751,748 | A | | 8/1973 | Roe et al. |
| 3,774,278 | A | | 11/1973 | Ashton |
| 3,877,123 | A | | 4/1975 | Pharris |
| 3,986,226 | A | | 10/1976 | Roe et al. |
| 4,196,805 | A | | 4/1980 | Banno |
| 4,209,883 | A | | 7/1980 | Hawk |
| 4,316,301 | A | | 2/1982 | Smith et al. |
| 4,361,923 | A | | 12/1982 | McKay |
| 4,402,102 | A | | 9/1983 | Al-samman |
| 4,467,509 | A | | 8/1984 | Dezen |
| 4,615,634 | A | | 10/1986 | Matsuda |
| 4,717,276 | A | | 1/1988 | O'Brien et al. |
| 4,897,893 | A | | 2/1990 | Barker |
| 4,937,909 | A | | 7/1990 | Georgiou |
| 4,985,959 | A | | 1/1991 | Lieberman et al. |
| 5,210,899 | A | | 5/1993 | Goldstein et al. |
| 5,345,648 | A | | 9/1994 | Graves |
| 5,490,303 | A | | 2/1996 | Graves |
| 5,619,769 | A | | 4/1997 | Hutt |
| 5,806,131 | A | | 9/1998 | Tennant |
| 5,903,952 | A | | 5/1999 | Camp, Jr. et al. |
| 5,971,638 | A | * | 10/1999 | Sato et al. .................. 400/578 |
| 6,101,662 | A | | 8/2000 | Polzin et al. |
| 6,102,382 | A | | 8/2000 | Labesky |
| 6,851,155 | B2 | | 2/2005 | Dove |
| 2002/0138935 | A1 | | 10/2002 | Lanz |

FOREIGN PATENT DOCUMENTS

| | | | |
|---|---|---|---|
| DE | 922 693 | | 7/1949 |
| DE | 2 119 004 | | 10/1972 |
| DE | 8525264.6 | U1 | 10/1985 |
| DE | 3903519 | | 8/1990 |
| FR | 1.107.072 | | 12/1955 |
| FR | 1.272.880 | | 9/1961 |
| GB | 749585 | | 5/1956 |
| JP | 62-155966 | | 7/1987 |
| WO | 00/37184 | | 6/2000 |

* cited by examiner

METHOD OF MANUFACTURING A PAINT ROLLER SUPPORT

CROSS-REFERENCE TO RELATED APPLICATION

This present application is a continuation of U.S. application Ser. No. 10/391,496, filed Mar. 17, 2003 now U.S. Pat. No. 7,028,365, which is incorporated herein by reference.

FIELD

The present invention concerns paint roller supports used for applying paint or other surface coatings to a surface.

BACKGROUND

Paint rollers have been used for a long time to apply paint to surfaces. A natural complement to the paint brush, paint rollers apply paint quickly and provide a uniform paint texture that can hide some surface imperfections. Unfortunately, most paint rollers allow the roller cover to slowly slide off of the roller support during use. The painter is then required to periodically push the roller cover back to its desired position. Accordingly, a need exists for a paint roller that retains the roller cover in place under normal conditions of use, yet allows a user to remove the roller cover for cleaning or replacement.

SUMMARY

The present invention is directed toward various combinations of novel and non-obvious aspects of embodiments of a paint roller support and a method for manufacturing a paint roller support, as defined in the claims below.

According to one representative embodiment, a paint roller support comprises a frame having an elongated roller portion and at least one cover support, or hub, rotatably coupled to the roller portion of the frame for supporting a conventional roller cover. A locking spring for retaining the roller cover is rotatably coupled to the roller portion of the frame. The locking spring exerts a retaining force against an inner surface of the roller cover for frictionally retaining the roller cover on the support while the paint roller support is used to deliver paint to a surface. In an illustrated embodiment, the lock spring comprises an open, or split, ring-shaped structure.

In particular embodiments, the roller support has a stationary bearing disposed on the roller portion of the frame and the cover support is rotatably mounted on the bearing. In other embodiments, two spaced apart stationary bearings are disposed on the roller portion of the frame and a cover support is rotatably mounted on each bearing.

According to another representative embodiment, a paint roller support for supporting a roller cover comprises an elongated shaft, a first hub rotatably coupled to the shaft, and a second hub rotatably coupled to the shaft and spaced axially from the first hub. The first and second hubs are mounted for independent rotational movement relative to each other and the shaft. A biasing mechanism, carried by one of the first and second hubs, exerts a radially outwardly directed biasing force against an inside surface of the roller cover sufficient to retain the roller cover on the hubs while the paint roller support is used to apply paint to a surface.

According to yet another representative embodiment, a paint roller support comprises an elongated shaft having a raised surface portion. At least one bearing is disposed on and frictionally engages the raised surface portion such that the bearing is fixed against rotational and axial movement relative to the shaft. A cover support having an outer surface engaging the inside surface of a roller cover is mounted on the bearing for rotational movement relative thereto. In particular embodiments, the raised surface portion is an embossed surface portion formed on the shaft.

According to still another representative embodiment, a paint roller support for supporting a roller cover comprises an elongated shaft and a roller-cover grabbing mechanism rotatably coupled to the shaft. The roller-cover grabbing mechanism is configured to exert a radially outwardly directed retaining force that is sufficient to deform the inside surface of the roller cover, at least while the roller cover is engaged by the roller-cover grabbing mechanism.

According to another representative embodiment, a paint roller support for a roller cover comprises an elongated shaft and at least one cover support rotatably coupled to the shaft. The cover support defines an annular space in which a roller-cover retaining element is disposed. The roller-cover retaining element exerts a retaining force against an inside surface of the roller cover for frictionally retaining the roller cover on the paint roller support during use. The annular space is dimensioned to permit a limited amount of radial and axial movement of the retaining element, and therefore the roller cover retained by the retaining element.

A method for manufacturing a paint roller support, according to one embodiment, comprises forming a raised surface portion on an elongated shaft. A bearing is placed on the raised surface portion so that the bearing frictionally engages the raised surface portion and is retained against rotational and axial movement relative to the shaft. In some embodiments, the raised surface portion comprises an embossed surface portion, which can be formed, for example, by stamping the shaft.

The foregoing and other features and advantages of the invention will become more apparent from the following detailed description of several embodiments, which proceeds with reference to the accompanying figures.

DETAILED DESCRIPTION

Figure 1:
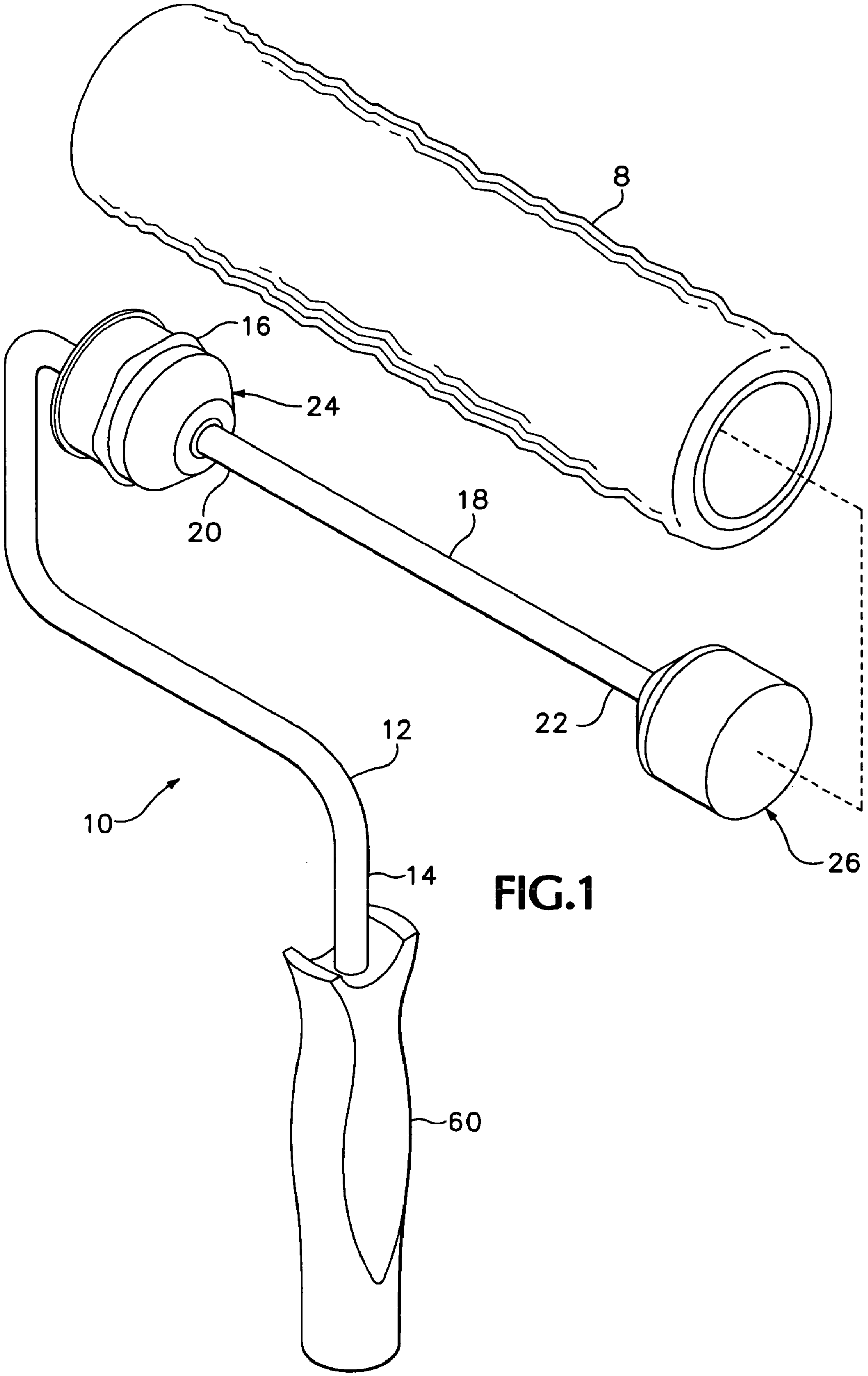
FIG. 1 is a perspective view of a paint roller support according to one embodiment, shown with a paint roller cover removed from the roller support.

FIG. 1 shows a paint roller support 10 according to one embodiment and a conventional paint roller cover 8 shown removed from the roller support 10 for clarity. The roller support 10 in the illustrated configuration includes a frame 12 and a handle 60 coupled to a lower end portion 14 of the frame 12 in a conventional manner. The frame 12 also includes a shaft, or rod, 18 (also referred to herein as the roller portion of the frame 12) having an inboard end portion 20 and an outboard end portion 22. The shaft 18 can be made from any suitable materials, such as aluminum or steel.

In alternative embodiments, the handle 60 is configured to be connectable to an extension rod (not shown). In other embodiments, the handle 60 is removable from the frame 12 and the lower end portion 14 of the frame 12 is configured to be connectable to an extension rod.

An inboard cover support assembly 24 is mounted for rotational movement on the inboard end portion 20 of the shaft 18. An outboard cover support assembly 26 is mounted for rotational movement to the outboard end portion 22 of the shaft 18. In use, the cover support assemblies 24, 26 support the cover 8 and allow the cover 8 to be rolled along a surface (e.g., a wall) for applying paint or other surface coating to the surface.

In particular embodiments, a roller-cover retaining element (also referred to herein as a biasing mechanism, a cover-gripping element and a cover-grabbing mechanism) exerts a radially outwardly directed retaining force against the inside surface of the roller cover 8 to frictionally retain the cover 8 on the cover support assemblies 24, 26 during use. In one specific implementation, as shown in FIG. 1, the roller-cover retaining element is a locking spring 16, which is retained by the inboard cover support assembly 24. The locking spring 16 and other embodiments of a roller-cover retaining element are further described below.

Although the embodiments of the paint roller support disclosed herein are shown as supporting a roller cover for applying paint or other surface coating, it also could be used for rotatably supporting other tubular articles, such as a roller of paper in a paper dispenser.

In the illustrated embodiment, the cover support assemblies 24, 26 are mounted for independent rotational movement; that is, each assembly 24, 26 can freely rotate with respect to each other when the roller cover 8 is not on the roller support 10. In other embodiments, however, the cover support assemblies 24, 26 can be interconnected to each other. For example, the cover support assemblies 24, 26 can be interconnected to each other with spring wires, such as used in a conventional cage assembly.

In particular embodiments, such as shown in FIG. 1, the cover support assemblies 24, 26 desirably are longitudinally spaced from each other to support the opposite end portions of the cover 8 to ensure the cover 8 is properly balanced during use. However, in other embodiments, the cover support assemblies 24, 26 can be spaced inwardly of the inboard and outboard end portions of the shaft 18, closer to the center of the shaft 18. In still other embodiments, the roller support 10 can have a single rotatable cover support or more than two cover supports. Where a single cover support is used, the cover support desirably is much longer than the illustrated cover supports 24, 26 and is positioned at the center of the shaft 18 to balance the cover 8.

Figure 2:
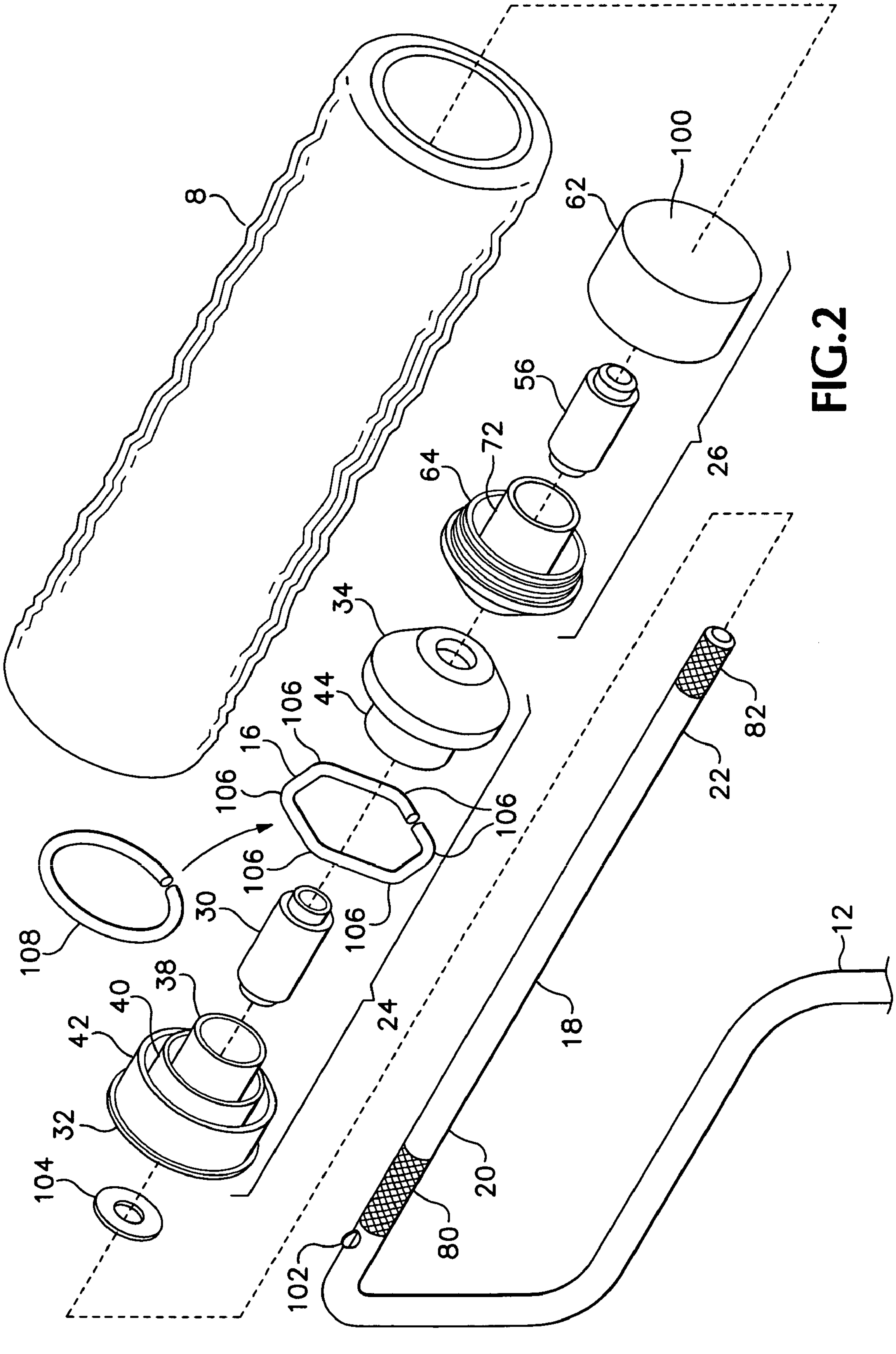
FIG. 2 is an exploded perspective view of the paint roller support and the roller cover of FIG. 1.
Figure 3:
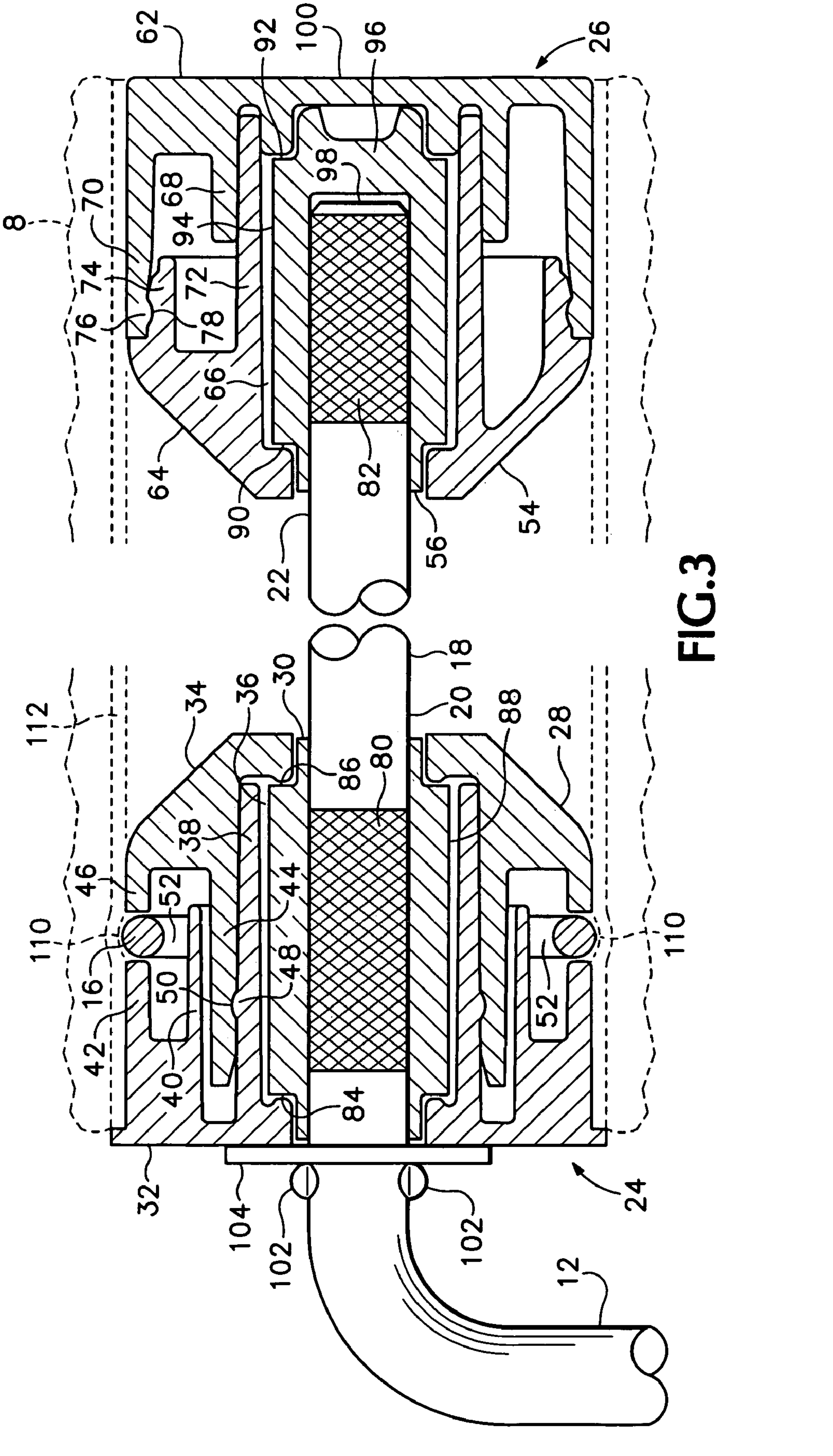
FIG. 3 is a cross-sectional view of the roller support of FIG. 1 taken along a longitudinal axis of the roller support, shown with a roller cover installed on the roller support.

Referring to FIGS. 2 and 3, there are shown an exploded view and a cross-sectional view, respectively, of the roller support 10 shown in FIG. 1. In the illustrated embodiment, the inboard cover support assembly 24 comprises a rotatable inboard cover support 28 (also referred to herein as the outboard hub or end cap) (FIG. 3) and an inboard bearing 30. Cover support 28 is freely rotatable with respect to bearing 30 and shaft 18. The cover support 28 in the illustrated configuration comprises a first portion 32 and a second portion 34, which, when assembled, form a bearing-receiving space 36 in which the bearing 30 is disposed (FIG. 3).

As shown in FIGS. 2 and 3, the first portion 32 has a first longitudinally extending sleeve 38, a second longitudinally extending sleeve 40 spaced radially outwardly from the first sleeve 38, and an annular flange 42 spaced radially outwardly from the second sleeve 40. The second portion 34 has a longitudinally extending sleeve 44 and an annular flange 46 spaced radially outwardly from the sleeve 44. When assembled, sleeve 44 of the second portion 34 extends in an overlapping relationship with sleeve 38 of the first portion 32. In particular embodiments, as shown in FIG. 3, the outer surface of the first sleeve 38 is formed with an annular projection 48 that mates with a corresponding annular indention 50 in the adjacent inner surface of sleeve 44 to form a "snap fit" connection to secure the first and second portions 32, 34.

As best shown in FIG. 3, a receiving space 52 for retaining the locking spring 16 is defined by annular flanges 42, 44 and sleeve 40. In the illustrated embodiment, the width of the receiving space 52 in the axial direction (i.e., the distance between the adjacent ends of flanges 42 and 46) is greater than the width of the locking spring 16 to permit a limited amount of axial movement of the locking spring 16 within the receiving space during use. In addition, the receiving space 52 desirably is dimensioned with sufficient clearance in the radial direction between flanges 42, 46 and sleeve 40 to permit compression of the locking spring 16 when the cover 8 is pressed over the spring and to permit a limited amount of radial movement of the compressed spring. This allows the locking spring 16 to "float" within the receiving space 52 during use. In this manner, the locking spring 16 resists forces acting to remove the roller cover 8 from the support 10, while permitting a limited amount of radial and axial movement of the roller cover 8 to reduce some of the radial and axial forces transmitted to the cover support assemblies 24, 26 during use.

In alternative embodiments, the receiving space 52 can be dimensioned such that the flanges 42, 46 abut the locking spring 16, thereby preventing any axial movement of the locking spring. In other embodiments, the receiving space 52 can be dimensioned to prevent radial movement of the locking spring 16 or both radial and axial movement.

The outboard cover support assembly 26 comprises a rotatable outboard cover support 54 (also referred to herein as the inboard hub or end cap) and an outboard bearing 56 (FIG. 3). Cover support 54 is freely rotatable with respect to bearing 56 and shaft 18. The cover support 54 comprises a first portion 62 and a second portion 64, which, when assembled, form a bearing-receiving space 66 in which the outboard bearing 56 is disposed (FIG. 3). The first portion 62 has longitudinally extending sleeves 68 and 70, which extend in an overlapping relationship with sleeves 72 and 74, respectively, of the second portion 64. Sleeve 70 is formed with an annular projection 76 that forms a snap fit connection with a corresponding indention 78 formed in sleeve 74 to secure the first and second portions 62, 64.

The inboard and outboard bearings 30, 56 desirably are retained against rotational and axial movement relative to the shaft 18. In particular embodiments, the bearings 30, 56 form a tight frictional fit with the surface of the shaft 18 to retain the bearings against rotational and axial movement. Desirably, the shaft 18 has raised surface portions, such as the illustrated inboard and outboard embossed surface portions 80 and 82, respectively, formed on the shaft 18, for frictionally engaging the inner surfaces of the bearings 30, 56. The embossed surface portions 80, 82 can be formed in any suitable manner, such as by stamping the shaft with a die.

In particular embodiments, the outboard embossed surface portion 82 is less aggressive than the inboard embossed surface portion 80; that is, the outer diameter of the outboard embossed surface portion 82 is less than the outer diameter of the inboard embossed surface portion 80. In this manner, when the roller support 10 is assembled, the inboard bearing

30 can be slid over the outboard embossed surface portion 82 without scoring or otherwise damaging the inner surface of the bearing 30.

In alternative embodiments, the inboard and outboard end portions 20, 22, respectively, of shaft 18 are stepped to form raised surface portions for frictionally retaining the bearings 30, 56. In other embodiments, the bearings 30, 56 can be retained against rotational and axial movement by securing the bearings on the shaft with a suitable adhesive. Alternatively, mechanical fasteners can be used to fasten the bearings to the shaft. For example, each bearing can be retained by a set screw extending through the bearing and tightened against the surface of the shaft 18.

In the illustrated embodiment, inboard bearing 30 has radial bearing surfaces 84 and 86, and an axial bearing surface 88 extending between the radial bearing surfaces 84, 86. Outboard bearing 56 is similarly formed with radial bearing surfaces 90 and 92, and an axial bearing surface 94 extending between the radial bearing surfaces 90, 92.

In the illustrated configuration, there are gaps between bearing surfaces 84, 86, and 88 and the adjacent inside surfaces of cover support 28. Likewise, there are gaps between bearing surfaces 90, 92, and 94 and the adjacent surfaces of cover support 54. In this manner, the bearings 30, 56 are loosely received in their respective bearing-receiving spaces 36, 66 to permit a limited amount of radial and axial movement of the cover supports 28, 54 relative to the bearings during use. Such movement of the cover supports 28, 54 relative to bearings 30, 56 reduces some of the radial and axial forces transmitted to the bearings during use. However, in other embodiments, the bearing-receiving spaces 36, 66 can be dimensioned to prevent radial and/or axial movement of the bearings 30, 56.

The outboard bearing 56 desirably has a closed end wall 96 adjacent the outboard end 98 of shaft 18. Advantageously, end wall 96 ensures that bearing 56 is retained against axial movement in the inboard direction in the event excessive axial forces are applied to the outboard end of the roller cover 10. Such excessive forces can occur, for example, if a user misuses the roller cover 10 as a hammer to drive protruding nails into a surface being painted. In alternative embodiments, bearing 56 can be formed with an internal bore that extends completely through the bearing.

Cover support 54 desirably has a closed end wall 100 adjacent end wall 96 of the bearing 56. End wall 100 serves to isolate the shaft 18 and bearing 56 from excessive axial forces applied to the outboard end of the roller support 10.

In particular embodiments, swedges 102 are formed on opposite sides of the inboard end portion 20 of shaft 18 and a washer 104 is disposed on the shaft between swedges 102 and the inboard cover support assembly 24, as known in the art. Swedges 102 and washer 104 ensure that cover support assembly 24 is retained against axial movement in the inboard direction in the event that excessive axial forces are applied to the cover support assembly 24.

As best shown in FIG. 2, the locking spring 16 is an open, or split, band, or ring-shaped structure, configured to exert a radially outwardly directed spring force, in a manner similar to a conventional snap ring. As illustrated in FIG. 3, the spring force exerted by the locking spring 16 against the inside surface 112 of the roller cover 8 desirably is sufficient to deform the inner surface of the roller cover 8, thereby creating detents, or indentations, 110 where the spring 16 contacts the inner surface 112 of the roller cover 8. As best shown in FIG. 2, the illustrated locking spring 16 is generally hexagonal in shape, with corners, or vertices, 106 that contact and deform the inside surface 112 of the roller cover 8. In any event, by deforming the inner surface 112 of the roller cover 8, the locking spring 16 prevents the roller cover 8 from slipping off the roller support 10 under normal conditions of use, yet permits a user to remove the roller cover 8 for cleaning or replacement.

In particular embodiments, the locking spring 16 is made from 0.156 inch diameter stainless steel wire, although other dimensions or materials can be used to form the locking spring. Although the illustrated locking spring 16 is hexagonal in shape, this is not a requirement. Accordingly, the locking spring can be any of various shapes. For example, the locking spring can be a polygon having any number of sides. Alternatively, a generally circular locking spring 108 can be used (FIG. 2).

The cover supports 28, 54 and bearings 30, 56 can be made from any suitable materials. In working embodiments, for example, bearings 30, 56 are made of a low-friction material, such as nylon. The cover supports 30, 56 are molded from a suitable polymeric material, such as an acetal resin (e.g., Delrin®).

Having described the structure of the paint roller support 10, a method for manufacturing the roller support will now be described. In one specific approach, the roller support 10 is made by first cutting to length a metal rod (e.g., aluminum or steel) of proper gauge and then bending the rod to create the shape of the frame 12 (as shown in FIGS. 1 and 2). The shaft 18 is then stamped to form the inboard and outboard embossed surface portions 80, 82. As noted above, the inboard embossed portion 16 desirably receives a more aggressive stamp to create an embossed surface area that has a larger diameter than that of the outer embossed surface area. Also, the shaft 18 is crimped to form swedges 102. The order of bending the frame 12, embossing the shaft 18, and crimping the shaft 18 is not critical.

The inboard cover support assembly 24 is assembled by placing bearing 30 between the first and second portions 32, 34 and then pressing together the first and second portions 32, 34. The outboard cover support assembly 26 is assembled in a similar manner. After the washer 104 is slid onto the shaft 18, the inboard cover support assembly 24 is pressed onto the shaft 18 until bearing 30 is positioned over embossed portion 80, as shown in FIG. 3. Finally, the outboard cover support assembly 26 is pressed onto the outboard end portion 22 of the shaft 18.

Figure 4:
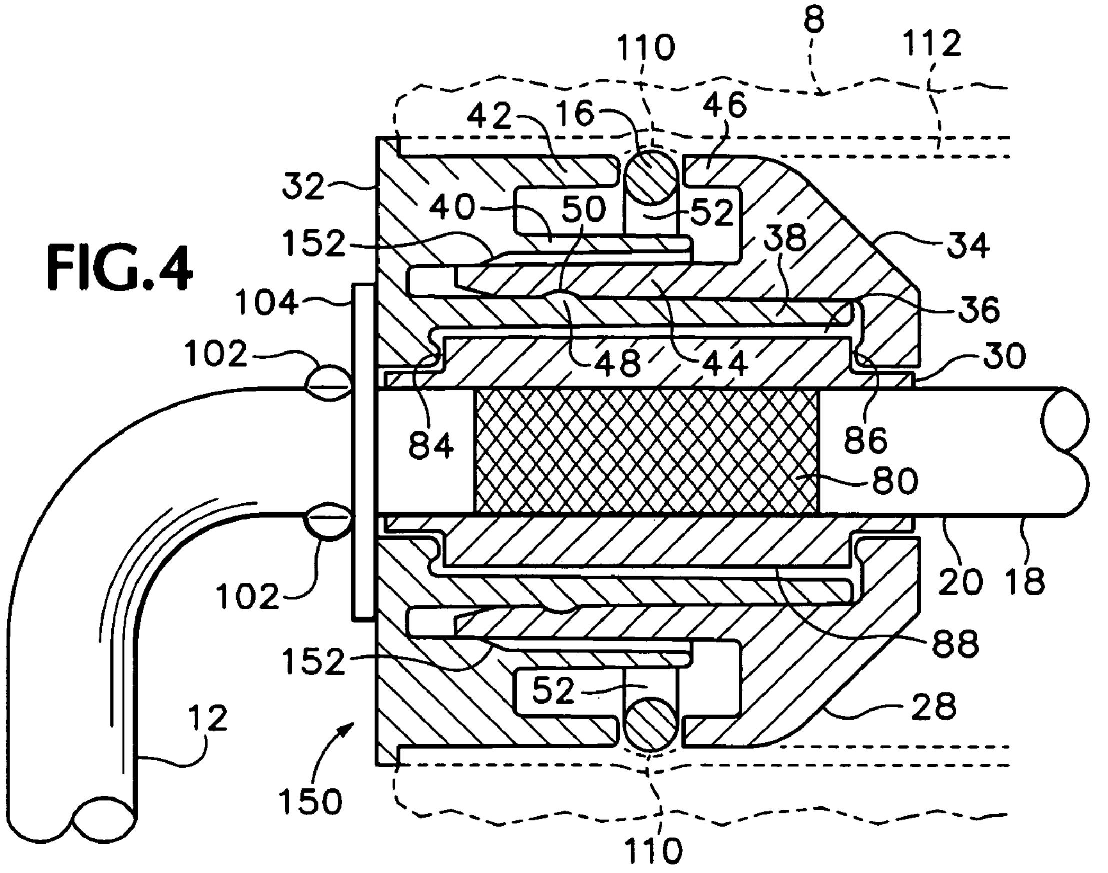
FIG. 4 is a cross-sectional view of an inboard cover support assembly of a roller support according to another embodiment.

FIG. 4 illustrates an inboard cover support assembly 150 according to another embodiment. This embodiment shares many similarities with the inboard cover support assembly 24 of FIG. 3. Hence, components in FIG. 4 that are identical to corresponding components in FIG. 3 have the same respective reference numerals and are not described further. In this embodiment, first portion 32 is formed with a stepped surface 152 that contacts the end portion of sleeve 44 of the second portion 34. The stepped surface 152 maintains the sleeve 44 in mating contact with sleeve 38 to better resist forces acting to separate the first and second portions 32, 34 of the cover support 28.

Figure 5:
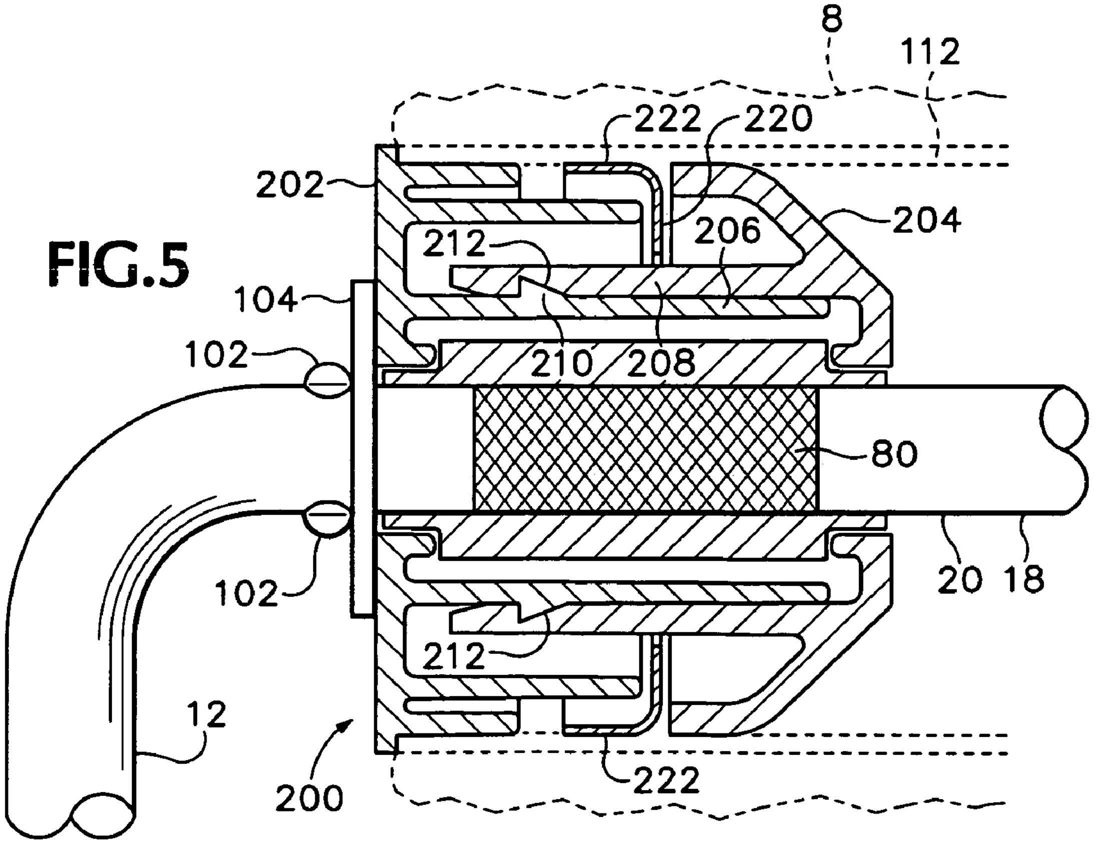
FIG. 5 is a cross-sectional view of an inboard cover support assembly of a roller support according to another embodiment.

FIG. 5 illustrates an inboard cover support assembly 200 according to yet another embodiment. Components in FIG. 5 that are identical to corresponding components in FIG. 3 have the same respective reference numerals and are not described further. Assembly 200 includes first and second hub portions 202 and 204, respectively. The first portion 202 has a sleeve 206 extending in an overlapping relationship with a sleeve 208 of the second portion 204. Sleeve 206 is formed with annular projection 210 that forms a snap fit connection with a corresponding annular recess 212 formed in sleeve 208. The cross-section of the projection 210 in this configuration has a vertical inboard surface. As be appreciated from FIG. 5, the projection 210, in cooperation with recess 212, resists forces acting to separate first and second portions 202, 204. A similar snap fit configuration can be used with the outboard cover support 54 of FIGS. 1-3.

In the embodiment of FIG. 5, a generally cup-shaped biasing member 220 is retained between first and second hub portions 202, 204. Biasing member 220 has a continuous annular flange 220 that frictionally retains the inside surface 112 of the roller cover 8.

In another embodiment, a roller support can have rotatable cover supports, such as cover supports 28, 54 of FIGS. 1-3, that are rotatably mounted to the shaft without any bearings. In yet another embodiment, each cover support can have a one-piece, unitary construction, instead of the two-piece construction shown in FIGS. 1-5.

The present invention has been shown in the described embodiments for illustrative purposes only. The present invention may be subject to many modifications and changes without departing from the spirit or essential characteristics thereof. We therefore claim as our invention all such modifications as come within the spirit and scope of the following claims.

We claim:

1. A method of manufacturing a paint roller support, the method comprising:

placing first and second bearings on an elongated shaft at spaced apart locations such that the bearings are retained against rotational and axial movement relative to the shaft; and placing first and second rotatable hubs on the first and second bearings, respectively, the hubs being configured to rotate relative to the bearings and to each other and having outer surfaces on which a roller cover is placed during use;

wherein the first and second hubs are retained on the shaft by the first and second bearings, respectively;

wherein the first bearing has a central portion having a first diameter and opposite end portions having a second diameter that is less than the first diameter, and the first hub has opposite end portions that rotate on respective end portions of the first bearing; and wherein the second bearing has a central portion having a first diameter and opposite end portions having a second diameter that is less than the first diameter, and the second hub has opposite end portions that rotate on respective end portions of the second bearing.

2. The method of claim 1, wherein the hubs are placed on the bearings prior to the bearings being placed on the shaft.

3. The method of claim 2, wherein the shaft has first and second embossed surface portions, the first bearing and first hub are placed together on the shaft by sliding them over the second embossed surface portion and onto the first embossed surface portion so that the first bearing is frictionally retained at a fixed position by the first embossed surface portion, and the second bearing and second hub are placed together on the shaft by sliding the second bearing onto the second embossed surface portion so that the second bearing is frictionally retained at a fixed position by the second embossed surface portion.

4. The method of claim 3, wherein the embossed surface portions are formed by stamping the shaft.

5. The method of claim 3, wherein the first embossed surface portion has a larger diameter than the second embossed surface portion.

6. The method of claim 1, wherein the first and second bearings are retained against rotational and axial movement relative to the shaft by frictional engagement of the bearings with the shaft.

7. The method of claim 6, wherein the first and second bearings frictionally engage first and second raised surface portions, respectively, on the shaft.

8. The method of claim 1, wherein the first hub substantially encloses the first bearing and the second hub substantially encloses the second bearing.

9. The method of claim 1, wherein:

the first hub has a central portion extending between the opposite end portions thereof, the central portion positioned generally co-axially with respect to the central portion of the first bearing and having an inner diameter that is greater than the inner diameters of the opposite end portions thereof; and the second hub has a central portion extending between the opposite end portions thereof, the central portion positioned generally co-axially with respect to the central portion of the second bearing and having an inner diameter that is greater than the inner diameters of the opposite end portions thereof.

10. The method of claim 1, further comprising mounting a biasing mechanism on the first hub, the biasing mechanism configured to exert a radially outwardly directed biasing force against an inner surface of the roller cover sufficient to retain the roller cover on the hubs while in use yet allowing removal of the cover when desired.

11. A method of manufacturing a paint roller support, the method comprising:

placing a first cover support assembly at a first location on the shaft, the first cover support assembly comprising a first bearing retained against rotational and axial movement relative to the shaft and a first rotatable hub mounted on the first bearing, the first bearing being shaped to retain the first hub on the first bearing; and placing a second cover support assembly at a second location on the shaft spaced from the first location, the second cover support assembly comprising a second bearing retained against rotational and axial movement relative to the shaft and a second rotatable hub mounted on the second bearing, the second bearing being shaped to retain the second hub on the second bearing, the first and second hubs being rotatable relative to each other on their respective bearings;

wherein prior to placing the first cover support assembly on the shaft, the first cover support assembly is assembled by placing the first bearing between two hub portions and securing the hub portions to each other to form the first hub, and prior to placing the second cover support assembly on the shaft, the second cover support assembly is assembled by placing the second bearing between two hub portions and securing the hub portions to each other to form the second hub.

12. The method of claim 11, wherein the shaft has first and second raised surface portions, the first cover support assembly is placed on the shaft by sliding it over the second raised surface portion and onto the first raised surface portion and so that the first bearing is frictionally retained by the first raised surface portion, and the second cover support assembly is placed on the shaft by sliding it onto the second raised surface portion so that the second bearing is frictionally retained by the second raised surface portion.

13. The method of claim 12, wherein first and second raised surface portions are embossed surface portions of the shaft.

14. The method of claim 11, wherein the first and second cover support assemblies are positioned on the shaft so as to support only opposite end portions of a roller cover placed on the cover support assemblies.

15. A method of manufacturing a paint roller support, the method comprising:

placing first and second bearings on an elongated shaft at spaced apart locations such that the bearings are retained against rotational and axial movement relative to the shaft;

placing first and second rotatable hubs on the first and second bearings, respectively, the hubs being configured to rotate relative to the bearings and to each other and having outer surfaces on which a roller cover is placed during use;

wherein the first and second hubs are retained on the shaft by the first and second bearings, respectively; and wherein the act of placing first and second rotatable hubs on the first and second bearings, respectively, comprises assembling the first hub from respective first and second hub portions by placing the first bearing within the respective hub portions and securing the hub portions to each other, and assembling the second hub from respective first and second hub portions by placing the second bearing within the respective hub portions and securing the hub portions to each other.

16. The method of claim 15, wherein the hub portions of each of the first and second hubs are secured to each other by a snap-fit connection.

17. A method of manufacturing a paint roller support, the method comprising:

placing a first cover support assembly at a first location on the shaft, the first cover support assembly comprising a first bearing retained against rotational and axial movement relative to the shaft and a first rotatable hub mounted on the first bearing, the first bearing being shaped to retain the first hub on the first bearing; and placing a second cover support assembly at a second location on the shaft spaced from the first location, the second cover support assembly comprising a second bearing retained against rotational and axial movement relative to the shaft and a second rotatable hub mounted on the second bearing, the second bearing being shaped to retain the second hub on the second bearing, the first and second hubs being rotatable relative to each other on their respective bearings;

wherein:

the first hub has opposite end portions and a central portion extending between the opposite end portions thereof, the central portion having an inner diameter that is greater than the inner diameters of the opposite end portions thereof, the first bearing having a central portion positioned between the opposite end portions of the first hub;

the second hub has opposite end portions and a central portion extending between the opposite end portions thereof, the central portion of the second hub having an inner diameter that is greater than the inner diameters of the opposite end portions thereof, the second bearing having a central portion positioned between the opposite end portions of the second hub.

18. The method of claim 17, wherein:

the first bearing comprises end portions on opposite sides of its central portion, the end portions of the first bearing having an outer diameter that is less than the outer diameter of central portion of the first bearing; and the second bearing comprises end portions on opposite sides of its central portion, the end portions of the second bearing having an outer diameter that is less than the outer diameter of central portion of the second bearing.

19. A method of manufacturing a paint roller support, the method comprising:

placing first and second bearings on an elongated shaft at spaced apart locations such that the bearings are retained against rotational and axial movement relative to the shaft;

placing first and second rotatable hubs on the first and second bearings, respectively, the hubs being configured to rotate relative to the bearings and to each other and having outer surfaces on which a roller cover is placed during use;

wherein the first and second hubs are retained on the shaft by the first and second bearings, respectively; and mounting a biasing mechanism on the first hub, the biasing mechanism configured to exert a radially outwardly directed biasing force against an inner surface of the roller cover sufficient to retain the roller cover on the hubs while in use yet allowing removal of the cover when desired;

wherein the biasing mechanism comprises a non-circular split ring.

* * * * *